Aug. 24, 1937.   H. L. WAUGH   2,091,061
BUILDING CONSTRUCTION
Filed July 3, 1936   6 Sheets-Sheet 1
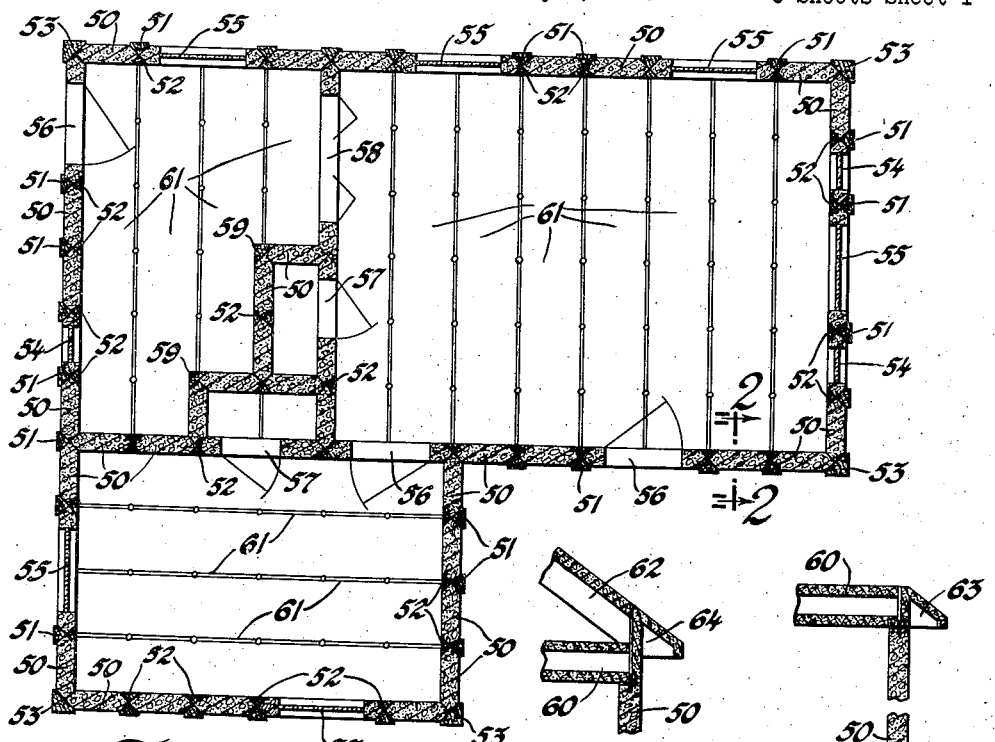
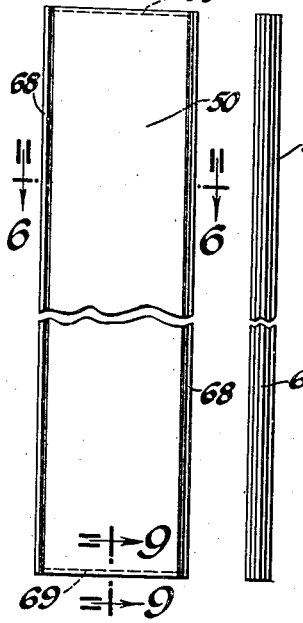
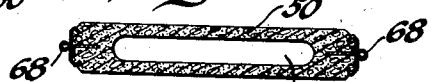
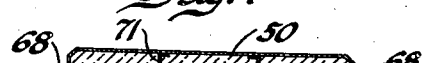
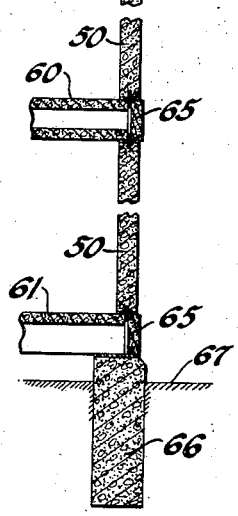
INVENTOR.
Hugh L. Waugh
BY Everett L. Wright
ATTORNEY.

Aug. 24, 1937.  H. L. WAUGH  2,091,061
BUILDING CONSTRUCTION
Filed July 3, 1936  6 Sheets-Sheet 2
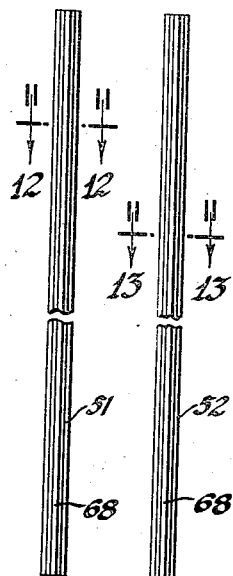
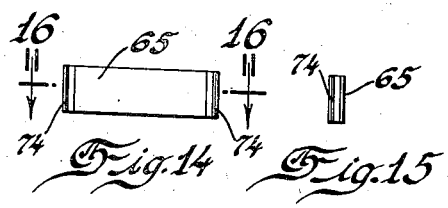
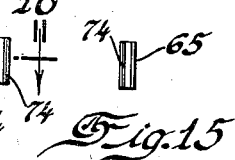
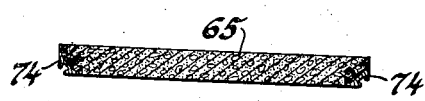
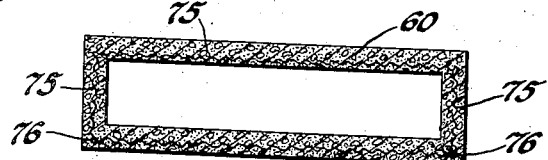
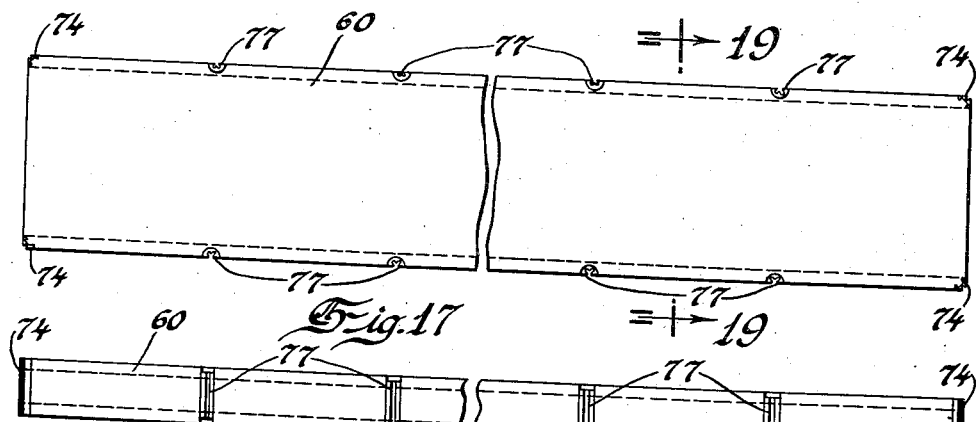
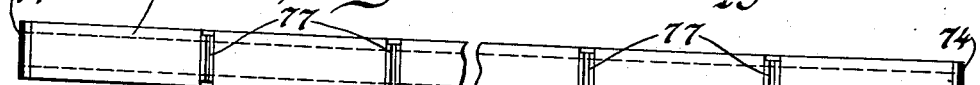
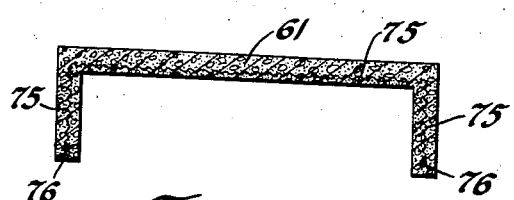
INVENTOR.
Hugh L. Waugh
BY Everett G. Wright
ATTORNEY.

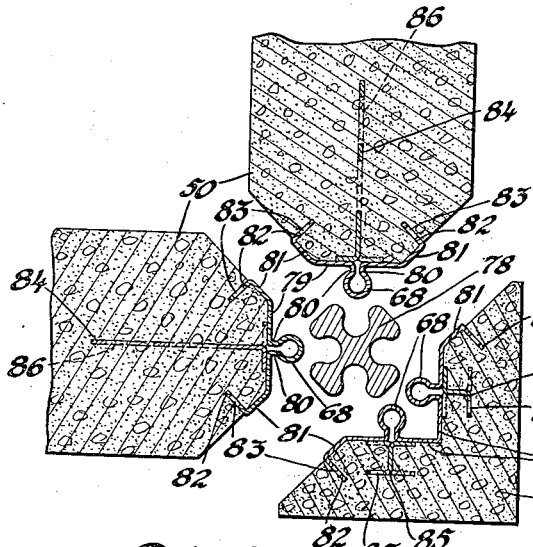
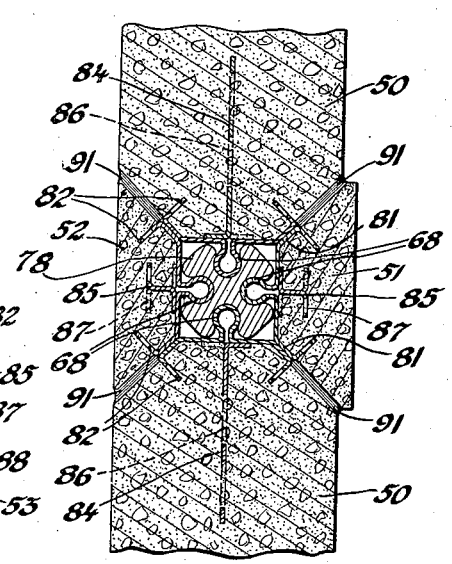
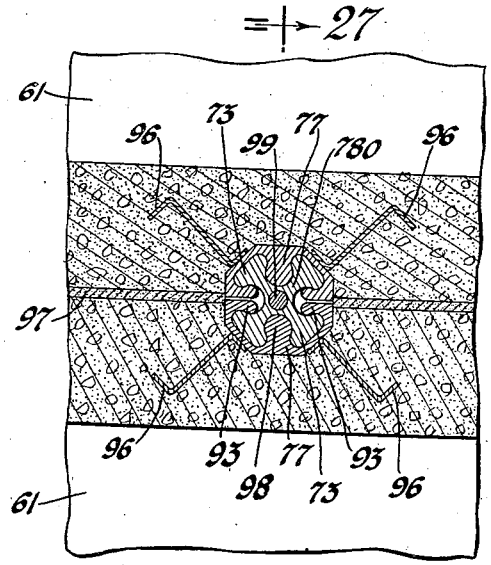
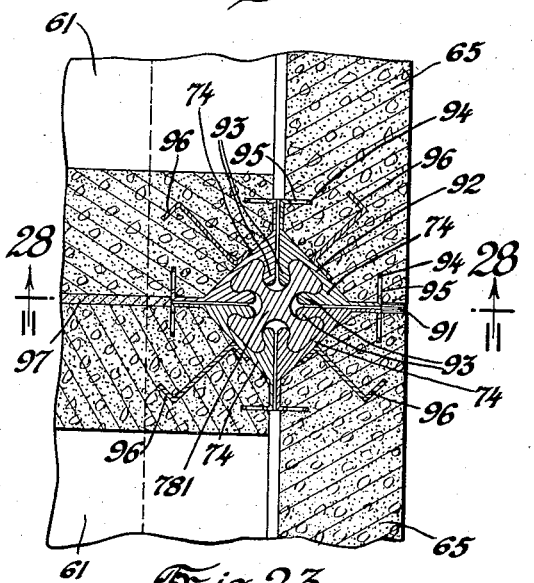
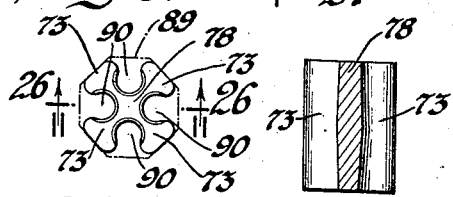

Aug. 24, 1937.     H. L. WAUGH     2,091,061
BUILDING CONSTRUCTION
Filed July 3, 1936     6 Sheets-Sheet 4

INVENTOR.
Hugh L. Waugh
BY Everett J. Wright
ATTORNEY.

Aug. 24, 1937.                H. L. WAUGH                 2,091,061
                           BUILDING CONSTRUCTION
                            Filed July 3, 1936              6 Sheets-Sheet 5
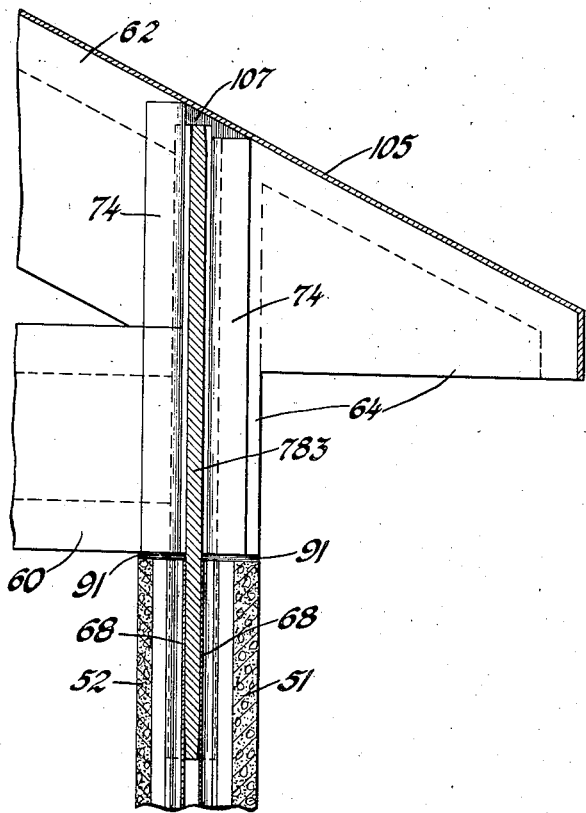
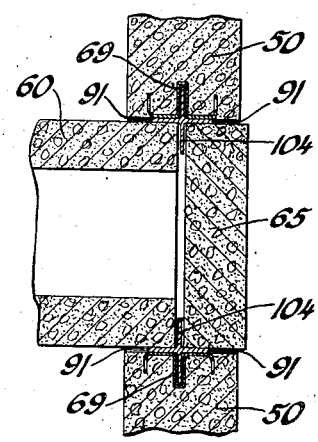
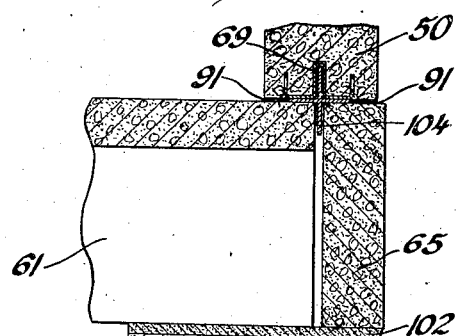
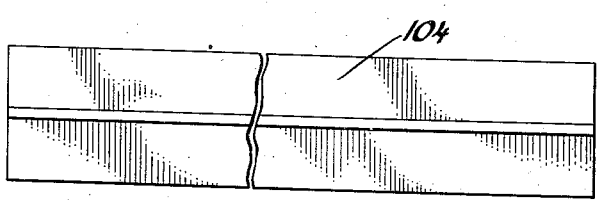
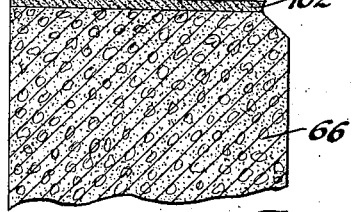
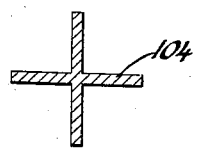
INVENTOR.
Hugh L. Waugh
BY Everett F. Wright
ATTORNEY.

Aug. 24, 1937.                H. L. WAUGH                 2,091,061
                          BUILDING CONSTRUCTION
                          Filed July 3, 1936           6 Sheets-Sheet 6
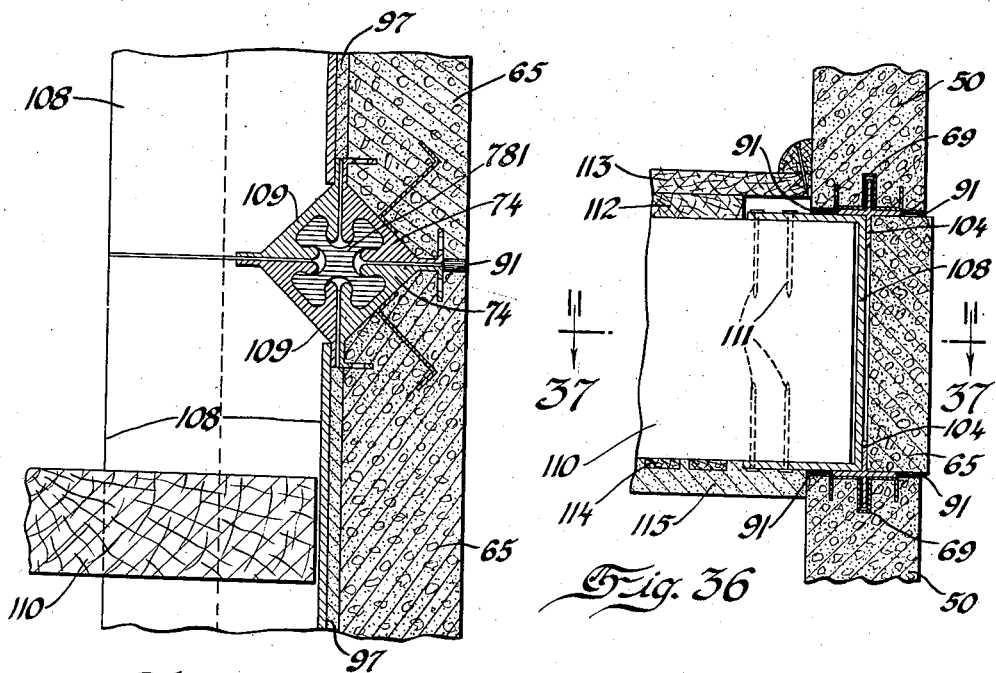
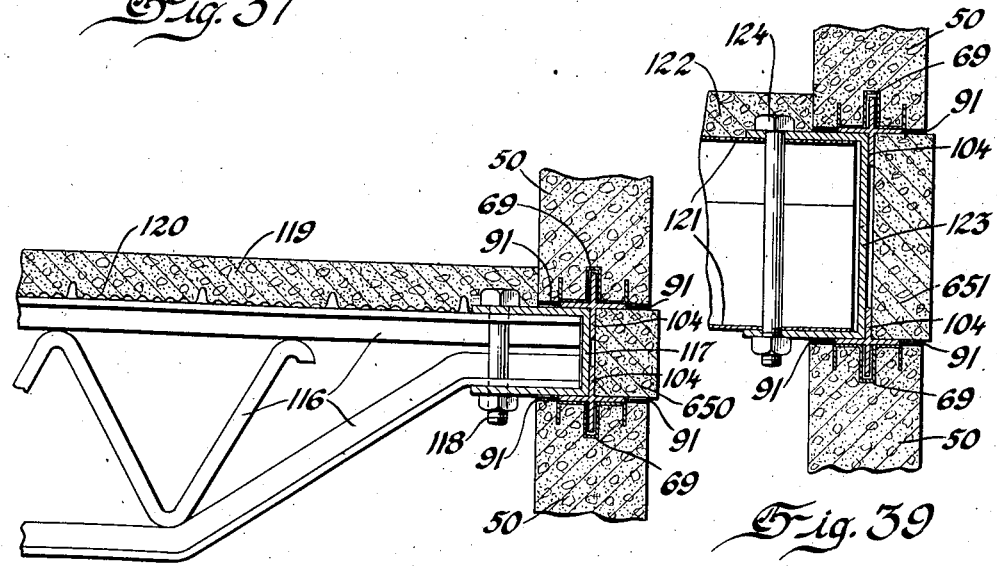
INVENTOR.
Hugh L. Waugh
BY  Everett G. Wright,
                    ATTORNEY.

Patented Aug. 24, 1937

2,091,061

UNITED STATES PATENT OFFICE 2,091,061

BUILDING CONSTRUCTION

Hugh L. Waugh, Ferndale, Mich.

Application July 3, 1936, Serial No. 88,791

20 Claims. (Cl. 72—1)

This invention relates to building construction and in particular to structural panel unit construction adapted generally to floor, wall, roof and partition construction and to any combination thereof.

In the prior art many types of unit construction for houses and buildings have been devised, however, none have been completely adaptable to floor, wall, roof and partition construction and capable of functioning as structural units with stress resisting joints therebetween.

The main object of this invention is to provide structural panel building units and means for securing the same into assembled relationship whereby complete structures or parts thereof may be pre-fabricated and erected into buildings of various size and configuration.

Another object of this invention is to provide structural panel building units and means for securing the same into assembled relationship which require a comparatively few types of panels and accessories to completely fabricate and erect a building.

Another object of this invention is to provide novel pre-fabricated building units including a weatherproof joint therefor.

Another object of this invention is to provide structural panel building construction including stress resisting weatherproof thermally efficient joints therefor.

Another object of this invention is to provide structural panel building construction including means for securing the panels laterally together which also serves as wall anchorage for floor panels and splicing means between superimposed panels.

Another object of this invention is to provide structural panel building construction having novel positive means by which the panels thereof are secured into an integral whole.

Another object of this invention is to provide structural panel building construction having means for securing the panels thereof together which also functions to properly align and level the various panels thereof.

Another object of this invention is to provide novel pre-fabricated building units adapted to function as bearing walls, structural floors, roof construction, eaves, curtain walls, partitions and the like, all capable of being assembled to each other and economically erected into a structure by simple inexpensive securing means.

Another object of this invention is to provide novel pre-fabricated unit construction adapted to be economically and quickly erected with a minimum of skilled labor.

Another object of this invention is to provide novel pre-fabricated bearing wall construction adapted to support and accommodate any of the usual types of construction.

Other objects of the invention will become apparent by reference to the following detailed description taken in connection with the accompanying drawings, in which:

Fig. 1 is a more or less diagrammatic plan view of a small house of structural panel unit construction showing the general adaptability of the invention to house construction.

Fig. 2 is a typical sectional view on the line 2—2 of Fig. 1 showing a typical arrangement of panels at the exterior wall of a house having a flat roof.

Fig. 3 is a fragmentary sectional view similar to Fig. 2 showing a typical arrangement of panels at the eave of a house having a pitched roof.

Figs. 4 and 5 are front and side elevational views respectively of a typical wall panel.

Fig. 6 is an enlarged horizontal sectional view taken on the line 6—6 of Fig. 4 showing a typical solid cast structural panel embodying the invention.

Fig. 7 is a horizontal sectional view similar to Fig. 6 showing a typical hollow cast structural panel embodying the invention.

Fig. 8 is a horizontal sectional view similar to Fig. 6 showing a typical hollow metal structural panel embodying the invention.

Fig. 9 is a fragmentary vertical sectional view taken on the line 9—9 of Fig. 4.

Figs. 10 and 11 are elevational views of typical exterior and interior wall joiner panels respectively.

Fig. 12 is an enlarged horizontal sectional view taken on the line 12—12 of Fig. 10.

Fig. 13 is an enlarged horizontal sectional view taken on the line 13—13 of Fig. 11.

Figs. 14 and 15 are rear and side elevational views respectively of a typical band course panel.

Fig. 16 is an enlarged horizontal sectional view taken on the line 16—16 of Fig. 14.

Figs. 17 and 18 are plan and side elevational views respectively of a typical floor panel.

Fig. 19 is an enlarged cross sectional view of box type floor panel taken on the line 19—19 of Fig. 17.

Fig. 20 is a cross sectional view similar to Fig. 19 showing an open bottom type floor panel.

Fig. 21 is a detailed horizontal sectional view of a typical joint between wall panels.

Fig. 22 is a detailed exploded horizontal sectional view of a typical corner joint between wall panels.

Fig. 23 is a detailed horizontal sectional view of a typical joint between the ends of floor panels and the band course panel.

Fig. 24 is a detailed horizontal sectional view of a typical joint between the sides of floor panels.

Fig. 25 is a plan view of a typical connector.

Fig. 26 is a vertical section through typical connector taken on the line 26—26 of Fig. 25.

Fig. 31 is a vertical sectional view similar to Figs. 28, 29 and 30 showing a typical joint between wall panels, ceiling panels, pitched roof panels and eave panels.

Fig. 32 is a vertical sectional view of the junction between the foundation wall, a first floor panel, band course and first story wall panel showing the longitudinal joint therebetween intermediate of the vertical joint between said panels.

Fig. 33 is a vertical sectional view of the junction between a first story wall panel, a second floor panel, band course panel and second story wall panel showing the longitudinal joint therebetween intermediate of the vertical joint between said panels.

Figs. 34 and 35 are elevational and cross sectional views respectively of the flashing and spacer bar used between longitudinal joints as shown in Figs. 32 and 33.

Fig. 36 is a vertical sectional view through prefabricated structural wall panels embodying the invention adapted to support and accommodate the usual wood joist and floor construction.

Fig. 37 is a horizontal sectional view taken on the line 37—37 of Fig. 36.

Fig. 38 is a vertical sectional view through prefabricated structural wall panels embodying the invention adapted to support and accommodate open web steel joist and poured concrete floor construction.

Fig. 39 is a vertical sectional view through prefabricated structural wall panels embodying the invention adapted to support and accommodate keystone floor panel and poured concrete floor construction.

Figure 27:
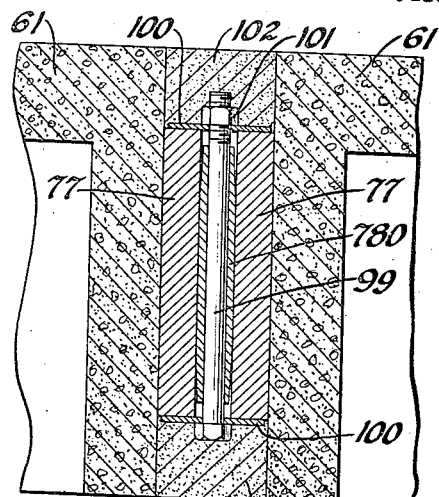
Fig. 27 is a vertical sectional view taken on the line 27—27 of Fig. 24.

Although the invention has been disclosed in the drawings as applied to house construction, it is to be understood that the use of the invention in other types of buildings and structures is contemplated, the disclosing of the invention in reference to its application to house construction having been selected to reveal its adaptability to the numerous and various conditions found therein.

Referring now to the drawings wherein like numerals refer to like and corresponding parts throughout the several views, Fig. 1 shows a more or less diagrammatic first floor plan of a small house constructed of structural floor and wall panels embodying the invention and secured together in the novel and facile manner as hereinafter described. Fig. 2 shows a typical arrangement of floor, wall, roof and eave panels at the exterior wall of the house assuming the said house to be two stories in height and having a flat roof. Fig. 3 shows the typical arrangement of wall, ceiling, roof and eave panels at the upper part of the exterior wall of the house assuming the house to have a pitched roof.

The invention is not limited to the use of any particular materials from which the structural panels may be pre-cast or pre-fabricated, it being contemplated that a cementitious material such as light weight concrete may be used with or without admixtures tending to reduce the thermal conductivity thereof or tending to increase the moisture repellant qualities thereof. The structural panels may also be formed from rolled steel plates, welded together, filled with a suitable insulation and finished as desired.

Referring particularly to Figs. 1, 2 and 3, the walls of the house shown therein are constructed of a plurality of typical structural wall panels 50 and typical exterior and interior joiner panels 51 and 52 respectively, all having suitable connecting strips thereon and secured together by novel connectors as hereinafter described. Corner joiner panels 53, narrow sash panels 54, wide sash panels 55, door panels 56, 57 and 58 having various width door openings therein, interior corner joiner panels 59 and the like provide a wide range of types of wall panels by means of which any reasonable shape and detail of house or other structure may be constructed, all of the said panels 53 to 59 inclusive having connecting strips thereon similar to the connecting strips on the typical panels 50, 51 and 52 as hereinafter described. The floors of the house are constructed of typical box type structural floor, roof and ceiling panels 60, open bottom type floor panels 61, pitched open bottom type roof panels 62, and eave panels 63 and 64 for flat and pitched roofs respectively. At the ends and sides of floor panels at the exterior wall, band course panels 65 provide bearing for the construction above and provide suitable closure for the open ends of said floor panels. A suitable foundation wall 66 preferably of poured concrete is provided under all walls and ends of first floor panels with the top thereof level and preferably not less than eight inches above grade 67.

All floor, ceiling, roof, eave and band course panels are provided with suitable connecting strips cooperating with each other and the connecting strips on wall and joiner panels and are engaged by suitable connectors for aligning the said panels and securing the same into a composite whole, all as hereinafter described.

In laying out a house, wall or other structure to be constructed in accordance with this invention, it is preferable and desirable to use center line of wall and center line of partition working points inasmuch as all vertical joints between wall and partition panels, and the ends and sides of floor, roof, ceiling and eave panels are secured together along and at the intersection of and on the said center lines. For example, if nominal twenty-four inch wide floor and wall panels are used as a standard, a house or other structure would be planned with all dimensions in a horizontal plane in two foot increments on wall center lines at right angles to each other. The height of the structure would be as desired using, for example, eight foot wall and partition panels, eight inch thick floor panels and eight inch high band course panels to correspond to the thickness of floor panels. The other panels required would be of such dimension to accommodate themselves to the typical panels as, for example, sash panels 55 and door panels 56, 57 and 58 would be nominally four or six feet wide as required.

For the purpose of clearly describing the invention with brevity, the specification will be confined hereinafter to typical panel construction and to the novel means for securely assembling and connecting the panels in proper alignment in a completed structure, the provisions for roofing, waterproofing, heating, plumbing, electric wiring, grounds, plastering if desired, interior and exterior finishing, painting and the like being subject to the many variations and selections available generally in the art of building construction and equipment.

A typical wall panel 50 of pre-cast light weight concrete is shown in Figs. 4, 5, 6 and 9. The panel 50 is provided with connecting strips 68 along the full length of the sides thereof and flashing strips 69 along the bottom and top ends thereof forming a centrally disposed slot in the ends of the said panels 50 as best shown in Fig. 9. Fig. 7 indicates an alternate embodiment of the typical wall panel 50 which is identical in every respect to the wall panel 50 shown in Fig. 6 except it is cast with a hollow portion 70 therein to decrease the weight of the panel if desired. Fig. 8 shows a horizontal section through a hollow metal embodiment of the typical wall panel 50 which is formed from rolled steel plates held in parallel spaced relation to each other by suitable spacers 71 and filled with an insulation 72, the side connecting strips 68 and top and bottom flashing strips 69 (not shown in Fig. 8) being formed and fabricated integral therewith.

Typical exterior and interior joiner panels 51 and 52 respectively of pre-cast concrete are shown in Figs. 10, 11, 12 and 13, each joiner panel being provided with connecting strips 68 along the full length of one side thereof as shown in the drawings, the said joiner panels being the same length as the typical wall panels 50.

A typical band course panel 65 of pre-cast concrete is shown in Figs. 14, 15 and 16, the said band course panel being as wide as the typical wall panels 50 and approximately half as thick. The height of the band course panels is equivalent to the depth of the floor panels with which they are used. The ends of the said band course panels 65 are provided with corner beveled connecting strips 74 extending the full height thereof.

A typical box type floor and ceiling panel 60 of pre-cast concrete is shown in Figs. 17, 18 and 19 which is preferably reinforced by a suitable mesh 75 and reinforcing rods 76 in such a manner as to better enable the panel to resist bending stresses as may be required thereof, the top of the panel serving as the floor or roof and the bottom thereof serving as the ceiling as indicated in Fig. 3. The ends of the panels 60 are provided with corner beveled connecting strips 74 extending the full depth thereof. The sides of the said panels 60 are provided with flush type connecting strips 77 shorter than the depth of the panel 60 with the ends thereof above the bottom and below the top of the said panel 60. The said flush type connecting strips 77 are spaced along the sides of the typical panel 60 at spaces which will permit the same to register with the wall panel joints, for example, two feet on center. The typical open bottom type floor panels 61 are pre-cast of concrete the same as the box type panel 60 and are of the same general detail except that no bottom is provided therefor, see Fig. 20.

If the structural panels are pre-cast of concrete or light weight concrete, it is contemplated that suitable reinforcement will be used in all panels as desired or required, the size of panel, the thickness thereof and the structural requirements of the panel being the determining factors in designating the amount and type of reinforcement required, if any. Where connecting strips are cast into the edges and corners of the various panels, the concrete may be thickened or reinforced if required to accommodate the suitable anchorages on the connecting strips which are embedded in the concrete for securely holding the various connecting strips in their proper relation in the various panels.

A typical joint between two typical wall panels 50 is shown in Fig. 21 in which the said typical wall panels 50, one typical exterior joiner panel 51 and one typical interior joiner panel 52 are secured in mitered relationship to each other by the typical connector 78. A typical corner joint between two typical wall panels 50 is shown in the exploded view in Fig. 22 in which the said typical wall panels 50, corner joiner panel 53 and the typical connector 78 comprise the mitered joint.

The sides of each typical panel 50 and one side of each joiner panel 51 and 52 are provided with full length connecting strips 68 as hereinbefore mentioned. The vertical corners of all wall and joiner panels are preferably chamfered on an angle of 45 degrees and the sides thereof are provided with continuous connecting strips designated by the numeral 68 throughout the drawings. The said connecting strips 68 are generally tubular in shape and are preferably formed of thin sheet steel integral with the base portion 79 thereof and held normal thereto by continuous necks 80 preferably laterally spaced in relation to each other as best shown in Figs. 21 and 22. The base portions 79 of the connecting strips 68 are bent at each side of the said connecting strips 68 at an angle preferably 45 degrees to provide metal beveled contact strips 81 for the mitered joints between panels. The outer edge of the beveled contact strips 81 of the base 79 of the connecting strips 68 are bent inward at 82 in respect to the panels onto the sides of which the said connecting strips are cast for anchorage therein, the said inwardly disposed portions 82 of the contact strips 81 are preferably provided with a plurality of apertures 83 to admit of adequate bonding with the wall panels when cast therein. Additional centrally disposed anchors 84 or 85 may be provided at the rear of the base 79 of the connecting strips 68, the said anchors 84 and 85 being suitably formed and preferably welded to the said base 79 and may be provided with suitable apertures therethrough designated by the numerals 86 and 87 respectively.

Although the connecting strips 68 have been specifically described in their application to typical panels 50, 51 and 52, connecting strips 68 are similarly applied to other wall panels as, for example, the corner joiner panel 53, in which case two connecting strips 68 are formed on a common angular base 88, the remaining portions of the connecting strips 68 such as the necks 80, beveled contact strips 81 including anchorage means 82 and 85 are generally the same as on the connecting strips 68 applied to the typical panels.

Figure 28:
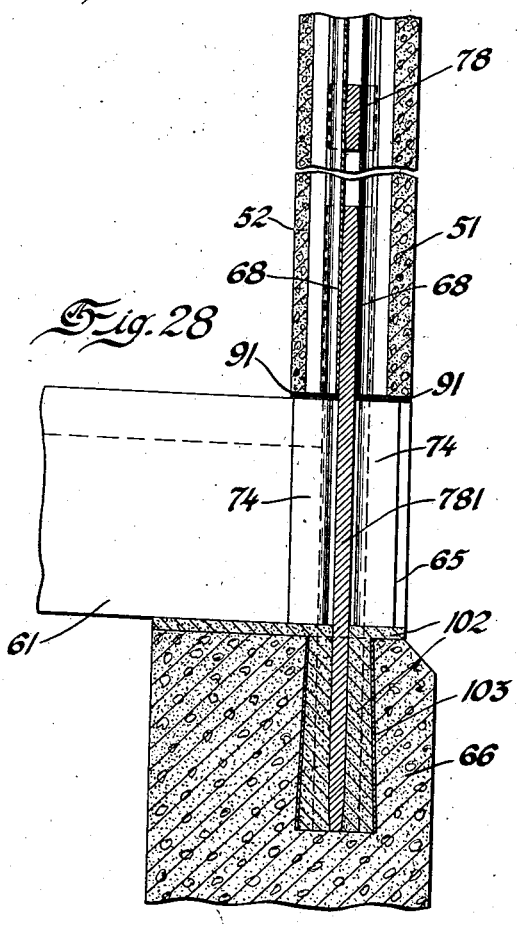
Fig. 28 is a vertical sectional view taken on the line 28—28 of Fig. 23 showing a typical joint between the foundation wall, first floor panels, band course panels and first story wall panels.

A typical connector 78 is shown in Figs. 25 and 26 and is best described as an octagonal member as indicated by the dot and dash lines 89 in Fig. 25 having oppositely disposed re-entrant flutes 90 formed therein, the walls of the said flutes being slightly larger in diameter than the outside diameter of the substantially tubular connecting strips 68 and preferably tapered to a larger diameter toward the ends of the said connector as shown in the drawings. Although described as a substantially octagonal member having oppositely disposed re-entrant flutes formed therein which forming may be accomplished by such means as broaching, the said connectors may be cast or extruded to the desired shape with a reaming operation after the general forming thereof to provide for the increased diameter of the re-entrant flutes at the ends thereof. The connector may be of any length as desired and be formed with the walls of the re-entrant flutes thereof of constant diameter and tapered at the ends thereof as indicated in Figs. 27 and 28 where connectors 780 and 781 are shown which are longer than the typical connectors 78. The connectors 78, 780 and 781 may also be described as being composed of a plurality of centrally joined integral T-shaped retainer strips 73 having the heads thereof outwardly disposed and preferably spaced at 90 degrees to each other in such a manner as to form a plurality of re-entrant flutes 90 therein.

The typical wall panels 50, exterior joiner panel 51 and interior joiner panels 52 are secured together in mitered relationship to each other as shown in Fig. 21 by driving one or more connectors 78 over the connecting strips 68 in telescopic relation thereto. The connectors 78 may be spaced at suitable intervals if desired and the wall, joiner, floor, band course and other panels may be erected on long connectors 781 as shown in Figs. 28 to 31 inclusive and, as hereinafter described, with typical connectors 78 therebetween.

It will be observed that the connectors 78 generally bind together the various panels comprising a mitered joint by gripping the connecting strips 68 thereon. The connecting strips 68 are, as hereinbefore described, preferably tubular in shape of thin sheet steel integral with the base portion 79 thereof and held normal to said base portion by continuous neck portions 80 laterally spaced in relation to each other, see Figs. 21 and 22. The spaced neck portions 80 holding the tubular connecting strips 68 normal to their base portion permits the said tubular connecting strips 68 to be compressed when the connectors 78 are telescoped over them or permits the connecting strips 68 to compress when they are inserted in telescopic relation into a connector 781 as hereinafter described. The spring-like compressibility of the connecting strips 68 allows the various wall panels and joiner panels to be easily and readily erected inasmuch as irregularities therein are compensated for when the connecting strips 68 and connectors 78 and 781 are assembled in telescopic relation to each other.

The metal beveled contact strips 81 at each side of the base of the connecting strips 68 are tightly brought together by the connectors 78 as indicated in Fig. 21 to accomplish the mitered joint between the various panels shown therein. The chamfered corners of all wall and joiner panels outward of the contact strips 81 thereon are spaced in respect to each other after the mitered joint between the said panels has been completed with the contact strips 81 of the connecting strips 68 tight against each other. The space between said chamfered corners is preferably caulked with a mastic or other preferably elastic caulking compound as indicated by the numeral 91 in the drawings thereby assuring a thoroughly waterproof joint between the various panels.

The corners of the typical floor panels 60 and 61 and the corners of the band course panels 65 are chamfered to accommodate corner connecting strips 74 each of which comprises a diagonally disposed base 92 and two bulbous shaped connecting strips 93 disposed on an angle of 45 degrees to the said base 92 and on an angle of 90 degrees to each other with the flat side of one connecting strip 93 parallel to the side of the panel and the flat side of the other connecting strip 93 parallel to the end of the panel, see Fig. 23. The opposed bulbous ends of the said bulbous shaped connecting strips 93 of the corner connecting strips 74 are spaced in relation to each other and the said connecting strip 74 is suitably hollowed out therebetween to form a flute slightly larger than the head of a T-shaped retainer strip 73 of the connector 781 to accommodate the same with a reasonable amount of clearance therebetween.

The flat sides of the bulbous connecting strips 93 of the corner connecting strips 74 are preferably extended beyond the base 92 thereof and bent inwardly in respect to the panels onto the corners of which the said connecting strips 74 are cast thereby forming inwardly disposed portions 94 which are provided with a plurality of apertures 95 to admit of adequate bonding with the said panels when cast therein. A plurality of additional anchors 96 secured to the rear of the base 92 of the corner connecting strips 74 may be provided. Although the connecting strips 74 have been shown and described as extending the full height of the typical floor panels and band course panels, it may be desirable to use one or more short connecting strips in place of the said full height strips, or it may be desirable to taper the walls of the flute formed between the two bulbous shaped connecting strips 93 of the said corner connecting strip 74.

Fig. 23 shows a typical joint between two floor panels 61 and two band course panels 65 each of which has been provided with corner connecting strips 74. It will be noted that the flat sides of the bulbous connecting strips 93 of the corner connecting strips 74 are slightly spaced in respect to adjacent strips 93 on adjacent panels to permit the panels to be joined to be readily assembled in telescopic relation to each other on the connector 781 with sufficient clearance to permit assembly of the joint without binding between panels. The vertical space between the band course panels 65 is preferably caulked with a mastic or other elastic caulking compound as indicated by the numeral 91 in the drawings.

The sides of the typical floor panels 60 and 61 are provided with a plurality of connecting strips 77 set with the exposed face thereof positioned to be flush with respect to like connecting strips 77 on adjacent panels, the face of the said connecting strips 77 being set out slightly from the sides of the said floor panels 60 and 61 to provide space for grouting the joint between the said panels as indicated by the numeral 97 in Fig. 24.

The flat sides of the connecting strips 93 of the corner connecting strips 74 are similarly set out slightly from the sides and ends of the floor panels 60 and 61 and the band course panels 65 as shown in Fig. 23 to provide a joint for grouting between the said panels as indicated by the numeral 97 therein.

The said connecting strips 77 comprise a semi-octagon strip of a length somewhat shorter than the depth of the panel 61 as shown in Figs. 24 and 27 having the ends thereof spaced inwardly in respect to top and bottom of the said floor panel. The said connecting strip 77 comprises two oppositely disposed bulbous connecting strips 93 having the flat sides thereof forming the exposed face of the connecting strip 77 and one connecting strip 98 disposed at 90 degrees to the said connecting strips 93, the said connecting strip 98 is spaced in respect to the said connecting strips 93 and the said connecting strip 77 is hollowed out therebetween to form two flutes each slightly larger than the T-shaped retainer strip 73 of the connector 780 to accommodate the same with a reasonable amount of clearance therebetween. A plurality of anchors 96 secured to the semi-octagon shaped connecting strip 77 are provided to admit of adequate bonding between the connecting strips 77 and the panels into which they are cast.

Figs. 24 and 27 show a typical vertical joint between the sides of two floor panels 61 each of which have been provided with connecting strips 77 as hereinbefore described. A connector 780 similar in detail to the typical connector 78 is inserted in telescopic relation to two connecting strips 77 as best shown in Fig. 24, the said connector 780 being slightly shorter than the connecting strips 77 as indicated in Fig. 27. The T-shaped retainer strips 73 of the connector 780 engage the connecting strips 93 and the connecting strip 98 of each of the two connecting strips 77 and secure the panels 61 in the desired lateral relation to each other. It will be noted that the flat sides of the connecting strips 93 of the connecting strips 77 are slightly spaced in respect to adjacent connecting strips 93 on adjacent panels to permit assembly of the joint without binding between panels.

The center of the connectors 780 is bored or cored to telescopingly accommodate a threaded bolt 99. After the said vertical joint between floor panels is assembled with the connector 780 in engagement with the connecting strips 77, the bolt 99 having washers 100 thereon which engage the tops and bottoms of the connecting strips 77 is inserted through the aperture in the connector 780 provided therefor. The tops and bottoms of the adjacent floor panels are brought into perfect alignment by turning the nut 101 on the threaded bolt 99 and tightly drawing the washers 100 against the ends of the connecting strips 77 as best shown in Fig. 27. The space above and below the washers 100 may be grouted as indicated by the numeral 102 in Fig. 27.

Referring now to Figs. 28 to 35 inclusive, the house or structure embodying the invention is preferably erected substantially as follows:

The foundation wall 66 shown in Fig. 28 is preferably poured of concrete with the top thereof substantially level and with a plurality of frustro-conical hollow inserts 103 therein spaced equivalent to the center of wall joints, say two feet on centers, and located on the center line of the wall panels above.

The corners of two floor panels 61 and two band course panels 65 are brought together over one of the said hollow inserts 103 and a long connector 781 is assembled in telescopic relation to the corner connecting strips thereon as shown in Figs. 23 and 28. This operation is repeated preferably until the entire first floor and first floor band course of the structure is assembled. The joints between the sides of floor panels as shown in Figs. 24 and 27 are then completed with the exception of the grouting. The floor and band course panels 61 and 65 respectively are then shimmed level along the foundation wall 66, the long connectors 781 are plumbed, and the said connectors 781 and the floor and band course panels are grouted in place as indicated by the numeral 102 in Fig. 28. The grout, preferably of quick hardening cement and sand, is then permitted to harden. The joints between the sides of floor panels may be grouted after the joints at the walls have been completed or after the entire structure has been erected, as desired.

A cross shaped flashing bar 104 shown in Figs. 34 and 35 is positioned in the slot provided between the end of the floor panels 61 and the band course panels 65 intermediate of the vertical joint between the said panels as indicated in Fig. 32. The top of the said flashing bar 104 extends upward into the slotted flashing strip 69 in the bottom of the wall panel 50. The said flashing bars 104 serve to space the said wall panels 50 slightly above the top of the band course panels 65 and the floor panels 61 to provide a horizontal joint therebetween which is preferably caulked with a mastic or other elastic type caulking compound indicated by the numeral 91 in Fig. 32.

The wall panels, of which the wall panel designated by the numeral 50 is typical, exterior joiner panels 51 and interior joiner panels 52 are erected with the flashing strip 69 in the bottom of the said wall panel 50 in registry with a flashing bar 104 and with the typical connecting strips 68 on the wall and joiner panels engaged by and in telescopic relation in respect to the long connector 781, and with one or more typical connectors 78 engaging the said connecting strips 68 along the height of the said wall and joiner panels, see Figs. 21, 28 and 32.

Cross shaped flashing bars 104 are set in the flashing strips 69 at the top of the first story wall panels of which the panel designated by the numeral 50 is typical. The second floor panels 60 and second story band course panels 65 are erected on top of said first story wall panels and flashing bars 104 with a long connector 781 assembled in telescopic relation to the corner connecting strips 74 thereon, the said long connector 781 engaging the connecting strips 68 at the upper end of the first story wall panels 50 and first story exterior and interior joiner panels 51 and 52 respectively. Cross shaped flashing bars 104 are then set in the slot provided between the end of the second floor panels 60 and the second story band course panels 65 intermediate of the vertical joint between the said panels. Second story wall panels and joiner panels of which the wall panel 50 and the exterior and interior joiner panels 51 and 52 respectively are typical are erected in a similar manner to the erection of first story wall panels with the flashing strip 69 in the bottom of said wall panels in registry with the flashing bar 104 and with the connecting strips 68 on the wall and joiner panels engaged by and in telescopic relation to the long connector 781, and with one or more typical connectors 78 engaging the said connecting strips 68 along the height of the said wall and joiner panels, see Figs. 21, 29 and 33.

Figure 29:
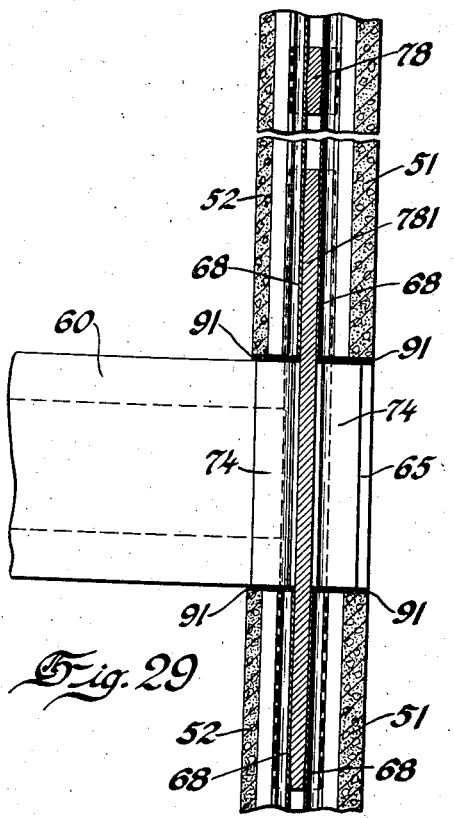
Fig. 29 is a vertical sectional view similar to Fig. 28 showing a typical joint between first story wall panels, second floor panels, band course panels and second story wall panels.

The said flashing bars 104 serve to space the said wall panels 50 above and below the top and bottom of the said second floor panels 60 and second story band course panels 65 to provide horizontal joints therebetween which are preferably caulked with mastic or other elastic type caulking compound as indicated by the numeral 91 in Figs. 29 and 33.

Figure 30:
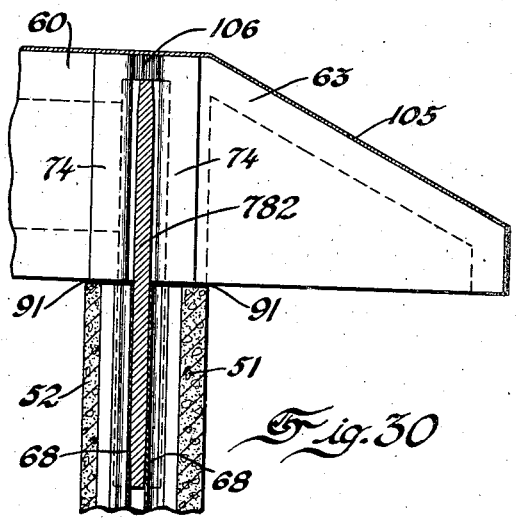
Fig. 30 is a vertical sectional view similar to Figs. 28 and 29 showing a typical joint between second story wall panels, flat roof panels and eave panels.

Referring now to Fig. 30, the top of connecting strips 68 on the second story wall and joiner panels of which the wall panel 50 and exterior and interior joiner panels 51 and 52 respectively are typical are secured together and telescopingly engaged by a connector 782 which protrudes thereabove a distance slightly less than the depth of the roof panel 60, the said connector 782 being similar to the connectors 78 and 781 hereinbefore described except that it is of a different length. Cross shaped flashing bars 104 are set in the flashing strips 69 in the top of the second story panels and the roof panels 60 and cornice panels 63 are erected thereon with the corner connecting strips 74 of the said roof panels 60 and cornice panels 63 telescopingly engaged by the upper end of the said connector 782. A suitable roofing 105 may be provided on top of the roof panels 60 and cornice panels 63. The space between the top of the connector 782 and the roofing 105 and the horizontal joints between the top of the second story wall panels 50 and the bottom of the roof and cornice panels 60 and 63 respectively are preferably caulked with a suitable mastic or other elastic caulking compound as indicated by the numerals 106 and 91 in Fig. 30.

If a pitched roof is used, the vertical joint between panels may be accomplished as shown in Fig. 31. The top of the connecting strips 68 on the second story wall and joiner panels of which the wall panel 50 and the exterior and interior joiner panels 51 and 52 respectively are typical are secured together and telescopingly engaged by a connector 783 which protrudes thereabove a distance slightly less than the depth of the cornice panel 64, the said connector being similar to the connectors 78, 781 and 782 except that it is of a different length. Cross shaped flashing bars 104 are set in the flashing strips 69 in the top of the second story wall panels and the ceiling panels 60, pitched roof panels 62 and the cornice panels 64 erected thereon with the corner connecting strips 74 of the said ceiling panels 60, pitched roof panels 62 and the cornice panels 64 telescopingly engaged by the upper end of the connector 783. A suitable roofing 105 may be provided on top of the pitched roof panels 62 and the cornice panels 64. The space between the top of the connector 783 and the roofing 105 and the horizontal joints between the top of the second story wall panels 50 and the bottom of the ceiling and cornice panels 60 and 64 respectively are preferably caulked with a suitable mastic or other elastic caulking compound as indicated by the numerals 107 and 91 in Fig. 30.

The construction shown in Figs. 36 and 37 is similar to the construction shown in Fig. 33 except that means for adapting the typical structural wall panels to support and accommodate the usual wood joist and floor construction is substituted for the typical floor panels 60 in Fig. 33.

Channel panels 108 are provided with corner connecting strips 109 welded thereto, the said corner connecting strips 109 being similar in detail to the corner connecting strips 74 on typical floor panels 60 and 61. The band course panels 65 and channel panels 108 are secured together by the connectors 781 in the same manner as the floor panels 60 and the band course panels 65 shown in Figs. 29 and 33. The usual wood joist or beams 110 are located between the upper and lower flanges of the channel panels 108, supported on the lower flange thereof, and may be anchored thereto by such means as the spikes 111 driven through suitably spaced apertures in the flanges of the said channel panels 108. The said wood joist or beams 110 may support the usual floor and ceiling construction comprising an underfloor 112, finished floor 113, wood lath 114 and plaster ceiling 115, all as shown in Fig. 36.

Fig. 38 shows the usual open web steel joist floor construction with the end of the steel joist 116 supported by shallow channel panels 117 which are similar to channel panels 108 except the depth thereof. The end of the steel joist 116 is secured in the channel panel by means of the bolts 118. A thin concrete floor 119 reinforced by a suitable metal lath 120 may be used as a flooring over the steel joist 116. The band course panels 650 are similar in every respect to the band course panels 65 except that the depth thereof corresponds to the depth of the shallow channel panels 117.

Fig. 39 shows the usual keystone floor construction 121 with a concrete surfacing 122 thereon supported by channel panels 123 which are similar to channel panels 108 except the depth thereof, the said keystone flooring being secured to and between the upper and lower flanges of the channel panels 123 by such means as the bolts 124. The band course panels 651 are similar in every respect to the band course panels 65 except that the depth thereof corresponds to the depth of the channel panels 123.

It will be apparent to those skilled in the art that the applicant has provided an improved type of structural unit panel construction including stress resisting weatherproof lateral and vertical joints between the said structural panels and novel connecting means adapted to tie the said panels together into an integral whole, the said connecting means serving the purposes of securing the structural wall panels laterally together, anchoring the floor construction to the wall panels which support the same and splicing superimposed panels together.

Although but one embodiment and several modifications of the invention have been shown in the drawings and described in detail, it is to be understood that changes including the size, shape, arrangement and detail of the various parts thereof may be made without departing from the spirit of the invention, and it is not intended to limit the scope of the invention other than by the terms of the appended claims.

I claim:

1. Structural unit panel construction comprising structural wall panels having the vertical corners thereof chamfered, a tubular connecting strip along each side of said wall panels, the said tubular connecting strips having a base integral therewith connected thereto by continuous spaced neck portions, the sides of the base of said tubular connecting strips being bent into the plane of said chamfered corners to provide contact strips having the surface thereof outwardly disposed in respect to the face of said chamfered corners, joiner panels having the vertical corners thereof chamfered, like tubular connecting strips including contact strips on said joiner panels, and means for telescopingly engaging said connecting strips whereby said panels are secured together in mitered relationship to each other with complementary contact strips in surface contact with each other.

2. Structural unit panel construction comprising structural wall panels having the vertical corners thereof chamfered, a tubular connecting strip along each side of said wall panels, the said tubular connecting strips having a base integral therewith connected thereto by continuous spaced neck portions, the sides of the base of said tubular connecting strips being bent into the plane of said chamfered corners to provide contact strips having the surface thereof outwardly disposed in respect to the face of said chamfered corners, joiner panels having the vertical corners thereof chamfered, like tubular connecting strips including contact strips on said joiner panels, and connectors having tapered flutes adapted to telescopingly engage said connecting strips whereby said panels are brought together and secured in mitered relationshiup to each other with complementary contact strips in surface contact with each other.

3. Structural unit panel construction comprising structural wall panels having the vertical corners thereof chamfered, a tubular connecting strip along each side of said wall panels, the said tubular connecting strips having a base integral therewith connected thereto by continuous spaced neck portions, the sides of the base of said tubular connecting strips being bent into the plane of said chamfered corners to provide contact strips having the surface thereof outwardly disposed in respect to the face of said chamfered corners, joiner panels having the vertical corners thereof chamfered, like tubular connecting strips including contact strips on said joiner panels, means for telescopingly engaging said connecting strips whereby said panels are secured together in mitered relationship to each other with complementary contact strips in surface contact with each other forming outwardly disposed open joints between said chamfered corners, and weather resisting caulking compound in said joints.

4. Structural unit panel construction comprising structural floor panels, corner connecting strips on vertical corners of said floor panels composed of two vertical angularly disposed bulbous connecting strips, and fluted connectors adapted to engage adjacent bulbous connecting strips on corners of adjacent floor panels when juxtaposed whereby said floor panels are laterally secured together at their ends.

5. Structural unit panel construction comprising structural floor panels and band course panels, corner connecting strips on vertical corners of said floor and band course panels composed of two vertical angularly disposed bulbous connecting strips, and fluted connectors adapted to engage adjacent bulbous connecting strips on corners of adjacent floor and band course panels when juxtaposed whereby said floor and band course panels are laterally secured together at their ends.

6. Structural unit panel construction comprising structural roof and cornice panels, corner connecting strips on vertical corners of said roof and cornice panels composed of two vertical angularly disposed bulbous connecting strips, and fluted connectors adapted to engage adjacent bulbous connecting strips on corners of adjacent roof and cornice panels when juxtaposed whereby said roof and cornice panels are laterally secured together at their ends.

7. Structural panel unit construction comprising a foundation wall, hollow inserts set in said foundation wall, structural floor panels supported on said foundation wall, band course panels opposite said floor panels, bulbous connecting strips on corners of said floor and band course panels, vertically disposed long fluted connectors telescopingly engaging said bulbous connecting strips grouted into said hollow inserts in said foundation wall and protruding above said floor and band course panels, structural wall and joiner panels superimposed on said floor and band course panels, vertically disposed tubular connecting strips on said wall and joiner panels secured together by telescoping the same on the protruding ends of said long fluted connectors, a plurality of short fluted connectors telescopingly engaging said tubular connecting strips on said wall and joiner panels at intervals along the height thereof, horizontally disposed spacer and flashing bars between said floor, band course and wall panels intermediate of said vertically disposed connecting strips, and weather resisting cau'k'ng in the horizontal joints formed by said spacer and flashing bars between said floor, band course and wall panels.

8. Structural panel unit construction comprising structural wall and joiner panels, vertically disposed tubular connecting strips on said wall and joiner panels, a plurality of short fluted connectors telescopingly engaging said tubular connecting strips at intervals along the height of said wall and joiner panels, long fluted connectors telescopingly engaging said tubular connecting strips at the top of said wall and jo'ner panels and protruding thereabove, floor and band course panels supported on said structural wall and joiner panels, bulbous connecting strips on corners of said floor and band course panels, said bulbous connecting strips telescopingly engaged by said long fluted connectors, structural wall and joiner panels superimposed on said floor and band course panels, vertically disposed tubular connecting strips on said superimposed wall and joiner panels secured together by telescoping the same on the protruding ends of said long fluted connectors, a plurality of short fluted connectors telescopingly engaging said tubular connecting strips on said superimposed wall and joiner panels at intervals along the height thereof, horizontally disposed spacer and flashing bars between said floor, band course and wall panels intermediate of said vertically disposed connecting strips, and weather resisting caulking in the horizontal joints formed by said spacer and flashing bars between said floor, band course and wall panels.

9. Structural panel unit construction comprising structural wall and joiner panels, vertically disposed tubular connecting strips on said wall and joiner panels, a plurality of short fluted connectors telescopingly engaging said tubular connecting strips at intervals along the height of said wall and joiner panels, long fluted connectors telescopingly engaging said tubular connecting strips at the top of said wall and joiner panels and protruding thereabove, roof and cornice panels supported on said structural wall and joiner panels, bulbous connecting strips on corners of said roof and cornice panels, said bulbous connecting strips telescopingly engaged by said long fluted connectors, horizontally disposed spacer and flashing bars between said roof, cornice and wall panels intermediate of said vertically disposed connecting strips, and weather resisting caulking in the horizontal joints formed by said spacer and flashing bars between said roof, cornice and wall panels.

10. Structural unit panel construction comprising structural floor panels, vertically disposed side connecting strips composed of two oppositely disposed spaced bulbous connecting strips having the flat sides thereof parallel to the sides of said floor panels and one intermediate connecting strip therebetween, and fluted connectors adapted to engage said connecting strips on sides of adjacent floor panels when juxtaposed whereby said floor panels are laterally secured together.

11. Structural unit panel construction comprising structural floor panels, vertically disposed side connecting strips composed of two oppositely disposed spaced bulbous connecting strips having the flat sides thereof parallel to the sides of said floor panels and one intermediate connecting strip therebetween, said side connecting strips having the ends thereof spaced inwardly in respect to the top and bottom of said floor panels, fluted connectors shorter than the height of said connecting strips adapted to engage said connecting strips on the sides of adjacent floor panels when juxtaposed whereby said floor panels are laterally secured together, the said fluted connectors having an aperture therethrough, washers having a central aperture therethrough positioned above and below adjacent side connecting strips, a bolt positioned through each of said connectors and washers having a nut threaded thereon adapted to horizontally align said floor panels by drawing the ends of said connecting strips against said washers.

12. Structural unit panel construction comprising structural wall panels, a tubular connecting strip along each side of said wall panels, joiner panels, like tubular connecting strips on said joiner panels, horizontally disposed channel panels adapted to support floor construction supported on said wall panels, corner connecting strips on ends of said channel panels secured to the back thereof composed of two vertical angularly disposed bulbous connecting strips, adjacent panels having like corner connecting strips, and fluted connectors adapted to engage adjacent bulbous connecting strips on corners of channel panels and said panels adjacent thereto when juxtaposed, said fluted connectors also engaging the tubular connecting strips on said wall and joiner panels.

13. In building construction of the class described, bearing wall panels, vertically disposed tubular connecting strips on said wall panels, joiner panels, like tubular connecting strips on said joiner panels, connectors having a plurality of tapered flutes adapted to telescopingly engage said connecting strips whereby wall and joiner panels are laterally brought together and securely joined by telescoping the said connectors on said connecting strips, load carrying panels supported on said wall panels, corner connecting strips on said load carrying panels composed of two vertical angularly disposed bulbous connecting strips, said load carrying panels juxtaposed to each other and arranged on said wall and joiner panels with adjacent bulbous connecting strips disposed in end registry with tubular connecting strips of said wall and joiner panels, and long fluted connectors telescopingly engaging both the bulbous connecting strips and tubular connecting strips whereby the entire structure is laterally connected and vertically spliced into a composite whole.

14. Structural unit panel construction comprising juxtaposed structural panels, connecting strips spaced along the sides of said panels with the ends thereof inwardly disposed in respect to the exposed surfaces of the said panels when positioned in aligned juxtaposition, connectors telescopingly engaging opposite connecting strips whereby said panels are laterally secured together, the said connectors being of a length not greater than the length of the said connecting strips and having a longitudinally disposed aperture therethrough, and means positioned through said aperture adapted to engage the ends of said connecting strips for aligning the exposed surfaces of said structural panels and securing the same in said alignment.

15. Unit panel construction comprising a plurality of structural panels, a substantially tubular resilient connecting strip along each side of said panels, joiner panels, like substantially tubular resilient connecting strips on said joiner panels, and connecting means having a plurality of re-entrant flutes adapted to telescopingly engage said resilient connecting strips on juxtaposed and superimposed panels whereby said panels are laterally secured and vertically spliced together.

16. Unit panel construction comprising a plurality of structural panels, a tubular connecting strip along each side of said panels, joiner panels, like tubular connecting strips on said joiner panels, and fluted means adapted to telescopingly engage said tubular connecting strips on juxtaposed and superimposed panels whereby said panels are laterally secured and vertically spliced together.

17. Unit panel construction comprising a plurality of structural panels, a substantially tubular resilient connecting strip along each side of said panels, and connecting means having a plurality of re-entrant flutes adapted to telescopingly engage said resilient connecting strips on juxtaposed and superimposed panels whereby said panels are laterally secured and vertically spliced together.

18. Unit panel construction comprising a plurality of structural panels, a substantially tubular resilient connecting strip along each side of said panels, joiner panels, like substantially tubular resilient connecting strips on said joiner panels, and connecting means having a plurality of re-entrant flutes adapted to telescopingly engage said resilient connecting strips on juxtaposed panels whereby said panels are secured together.

19. Unit panel construction comprising a plurality of structural panels, a tubular connecting strip along each side of said panels, joiner panels, like tubular connecting strip on said joiner panels, and fluted means adapted to telescopingly engage said tubular connecting strips on juxtaposed panels whereby said panels are laterally secured together.

20. Unit panel construction comprising a plurality of structural panels, a substantially tubular resilient connecting strip along each side of said panels, and connecting means having a plurality of re-entrant flutes adapted to telescopingly engage said resilient connecting strips whereby said panels are laterally secured together.

HUGH L. WAUGH.